(12) United States Patent
Flerlage et al.

(10) Patent No.: US 11,754,429 B2
(45) Date of Patent: Sep. 12, 2023

(54) MULTIFUNCTIONAL DUST TRAP

(71) Applicant: Honeywell International Inc., Morris Plains, NJ (US)

(72) Inventors: Norbert Flerlage, Loeningen (DE); Christian Lampe-Juergens, Spelle (DE); Tobias Meimberg, Osnabrueck (DE); Andreas Wuchrer, Georgsmarienhütte (DE); Ralf Schroeder Genannt Berghegger, Glandorf (DE)

(73) Assignee: Honeywell International Inc., Charlotte, NC (US)

( * ) Notice: Subject to any disclaimer, the term of this patent is extended or adjusted under 35 U.S.C. 154(b) by 99 days.

(21) Appl. No.: 16/949,697

(22) Filed: Nov. 11, 2020

(65) Prior Publication Data

US 2022/0146297 A1    May 12, 2022

(51) Int. Cl.
| | | |
|---|---|---|
| *G01F 15/12* | (2006.01) | |
| *B01D 45/16* | (2006.01) | |
| *B01D 46/00* | (2022.01) | |
| *B01D 46/42* | (2006.01) | |

(52) U.S. Cl.
CPC .......... *G01F 15/125* (2013.01); *B01D 45/16* (2013.01); *B01D 46/0032* (2013.01); *B01D 46/4236* (2013.01)

(58) Field of Classification Search
CPC .... B01D 46/4236; B01D 45/08; B01D 45/16; B01D 46/0002; B01D 46/0005; B01D 46/0032; G01F 15/125
See application file for complete search history.

(56) References Cited

U.S. PATENT DOCUMENTS

| | | | |
|---|---|---|---|
| 4,384,925 A | 5/1983 | Stetter et al. | |
| 4,596,144 A | 6/1986 | Panton | |
| 5,649,986 A * | 7/1997 | Mueller | B01D 46/4236 |
| | | | 55/385.3 |

(Continued)

FOREIGN PATENT DOCUMENTS

| | | |
|---|---|---|
| CN | 104515560 B | 4/2015 |
| CN | 109358306 A | 2/2019 |

(Continued)

OTHER PUBLICATIONS

Extended European Search Report dated Jan. 10, 2022, issued in connection with corresponding EP Application No. 21189738.4 (10 pages total).

*Primary Examiner* — Robert Clemente
(74) *Attorney, Agent, or Firm* — John Maldjian; Stevens & Lee PC

(57) ABSTRACT

A multifunctional dust trap for reducing an acoustic noise and dust filtering comprising: an inlet connected to a gas inlet of a gas meter; a chamber, connected to the inlet, to receive a flow of a gas, comprises: a first wall to deflect the flow of the gas in a first direction, wherein the first wall directs the flow of the gas into a cross sectional area of the chamber, which reduces a velocity of the deflected gas such that a centrifugal force guides a plurality of dust particles towards a base of the chamber; and a second wall to deflect the flow of the gas in a second direction; and an outlet, attached to the chamber, to enable an exit of a clean flow of the gas away from one or more flow inlets of a flow tube installed within the gas meter.

18 Claims, 20 Drawing Sheets

(56) References Cited

U.S. PATENT DOCUMENTS

| | | | |
|---|---|---|---|
| 5,969,263 A | 10/1999 | Ligneul et al. | |
| 6,766,276 B1 | 7/2004 | Dury | |
| 6,997,032 B2 | 2/2006 | Mattar | |
| 8,631,712 B2 | 1/2014 | Zhu et al. | |
| 8,955,392 B2 | 2/2015 | Liu et al. | |
| 9,671,269 B2 | 6/2017 | Berger | |
| 9,797,765 B2 | 10/2017 | Nagai | |
| 11,137,276 B1 | 10/2021 | Helfenstein et al. | |
| 2007/0017304 A1 | 1/2007 | Kumpfmueller | |
| 2007/0192046 A1 | 8/2007 | Hairston | |
| 2008/0087169 A1* | 4/2008 | Clark | B01D 46/4236 96/385 |
| 2009/0187356 A1 | 7/2009 | Artiuch | |
| 2012/0229295 A1 | 9/2012 | Sharma | |
| 2013/0152527 A1* | 6/2013 | Rother | B01D 46/0005 55/480 |
| 2013/0152528 A1* | 6/2013 | Disson | B01D 46/4236 55/480 |
| 2015/0276433 A1 | 10/2015 | Brah Majosyula | |
| 2016/0325218 A1* | 11/2016 | Hasegawa | B01D 46/0043 |
| 2017/0175741 A1 | 6/2017 | Nishikawa | |
| 2017/0254688 A1 | 9/2017 | Patten et al. | |
| 2017/0298597 A1 | 10/2017 | Hammond et al. | |
| 2019/0145804 A1 | 5/2019 | Artiuch | |
| 2020/0149944 A1 | 5/2020 | Haag et al. | |
| 2022/0146298 A1* | 5/2022 | Meimberg | B01D 45/08 |

FOREIGN PATENT DOCUMENTS

| | | | |
|---|---|---|---|
| CN | 109598353 A | 4/2019 | |
| CN | 110068789 A | 7/2019 | |
| CN | 110927654 A | 3/2020 | |
| DE | 19859854 A1 * | 6/2000 | B01D 46/0005 |
| EP | 1064522 A1 | 1/2001 | |
| JP | 2584935 B2 | 11/1996 | |
| JP | 4024110 B2 | 12/2007 | |
| JP | 5351742 B2 | 11/2013 | |
| JP | 2014092467 A | 5/2014 | |
| KR | 20180056003 A | 5/2018 | |
| KR | 20180056003 A | 5/2018 | |

* cited by examiner

MULTIFUNCTIONAL DUST TRAP

BACKGROUND

The present disclosure pertains to a dust trap to be used in meters such as gas meters.

DESCRIPTION OF RELATED ART

Ultrasonic transducers used in a gas meter are very sensitive to dust contamination and acoustic noises. The dust contamination and the acoustic noises present in the gas meter negatively impact a measuring accuracy of the gas meter, which can cause billing issues and other problems in a gas supply installation.

Traditionally, the gas meter uses separate elements for filtering dust particles, for flow guiding to efficiently guide a flow of a gas and to reduce the acoustic noises. However, using multiple parts increases a complexity of a design of the gas meter. Moreover, a size of the gas meter is also increased, which requires additional space to be installed within the gas supply installation, which subsequently adds cost for a customer.

There is thus a need for an apparatus and a method for achieving multiple functionalities by using a single dust trap in a more efficient manner.

SUMMARY

The disclosure reveals a multifunctional dust trap for reducing an acoustic noise and dust filtering, the multifunctional dust trap comprising: an inlet connected to a gas inlet of a gas meter. Further, the multifunctional dust trap comprises a chamber, connected to the inlet, to receive a flow of a gas and to reduce an acoustic noise by a reflection at one or more inner surfaces of the chamber, wherein the chamber comprises: a first wall to deflect the flow of the gas in a first direction, wherein the first wall directs the flow of the gas into a cross sectional area of the chamber, which reduces a velocity of the deflected gas such that a centrifugal force guides a plurality of dust particles carried by the gas towards a base of the chamber. Further, the chamber comprises a second wall to deflect the flow of the gas in a second direction, wherein the flow of the gas is deflected from the first direction to the second direction. Further, the multifunctional dust trap comprises an outlet, attached to the chamber, to enable an exit of a clean flow of the gas from the multifunctional dust trap such that the clean flow of the gas is directed away from one or more flow inlets of a flow tube installed within the gas meter resulting in a smooth flow of the gas in the flow tube.

The disclosure reveals a multifunctional dust trap for reducing an acoustic noise and dust filtering, the dust trap comprising: an inlet to be connected to a gas inlet of a gas meter. Further, the multifunctional dust trap comprises a chamber connected to the inlet, to receive a flow of a gas and to reduce an acoustic noise by a reflection at one or more inner surfaces of the chamber, wherein the chamber comprises: a first wall to deflect the flow of the gas in a first direction, wherein the first wall directs the flow of the gas into a cross sectional area of the chamber, which reduces a velocity of the deflected gas such that a centrifugal force guides a plurality of dust particles carried by the gas towards a base of the chamber. Further, the chamber comprises a second wall to deflect the flow of the gas in a second direction, wherein the flow of the gas is deflected from the first direction to the second direction; an acoustic mat, fixedly attached to the base and an inner surface of the chamber; and a plurality of ribs extending vertically in an upward direction from the base and transverse a direction of the flow of the gas, wherein the acoustic mat and/or each of the plurality of ribs absorbs an acoustic noise. Further, the multifunctional dust trap comprises an outlet, attached to the chamber, to enable an exit of a clean flow of the gas from the multifunctional dust trap such that the clean flow of the gas is directed away from one or more flow inlets of a flow tube installed within the gas meter resulting in a smooth flow of the gas in the flow tube.

The disclosure reveals a method for operating a multifunctional dust trap, the method comprising steps of: allowing a flow of a gas through an inlet of a multifunctional dust trap; deflecting the flow of the gas to a first direction, through a first wall of a chamber, such that a velocity of the gas is reduced and a centrifugal force guides a plurality of dust particles from the gas to a base of the chamber; collecting the plurality of dust particles within a plurality of ribs, attached to a base of the chamber; absorbing an acoustic noise by each of the plurality of ribs; deflecting the flow of the gas to a second direction through a second wall of the chamber; and filtering a plurality of micro-dust particles from the deflected flow of the gas in the second direction by using a filter pad, attached to an outlet of the multifunctional dust trap.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

DESCRIPTION

This description may provide one or more illustrative and specific examples or ways of implementing the present system and approach. There may be numerous other examples or ways of implementing the system and approach.

The present approach may provide a multifunctional dust trap for collecting and filtering a dust from a flow of a gas, guiding the flow of the gas, and eliminating an acoustic noise from the flow of the gas.

The present approach may provide a multifunctional dust trap with improved filtering of a dust and acoustic noise elimination while keeping a pressure loss to a minimum.

This present mechanism has a feature in it that it may use the advantages of the prior used dust traps without harvesting the disadvantage.

A technical benefit is to have a multifunctional dust trap capable of performing minimum three functions that saves space in a gas meter and further leads to reduced outer dimensions of the gas meter. Further, a combination of the three functions in the multifunctional dust trap can reduce pressure loss.

A business advantage is to have a multifunctional dust trap that saves material costs and reduces an outer dimension of a gas meter, which leads to reduced installation space for a customer.

Further, the multifunctional dust trap reduces an acoustic noise in the gas meter. This is especially interesting for markets with lots of interfering ultrasonic noises within the gas supply.

Figure 1A:
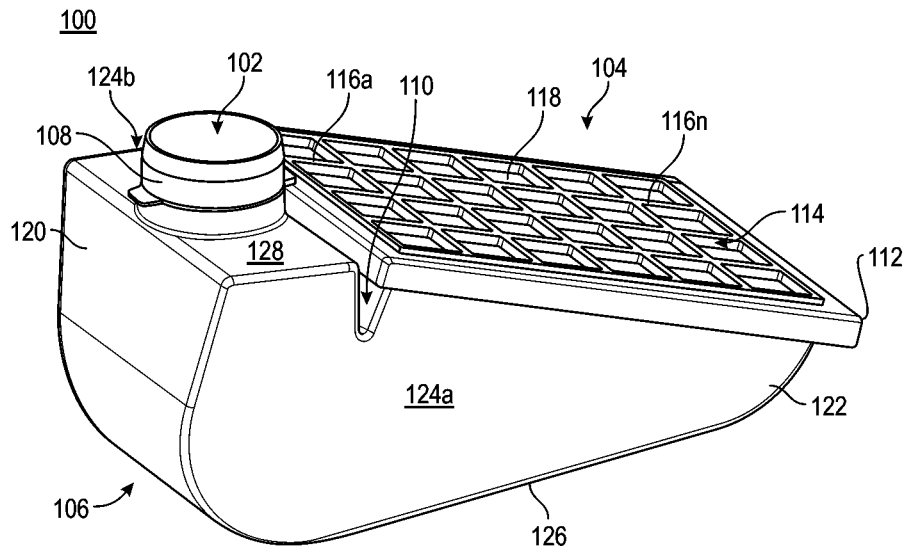
FIG. 1A is a diagram illustrating a multifunctional dust trap, according to an embodiment of the present mechanism.
Figure 2:
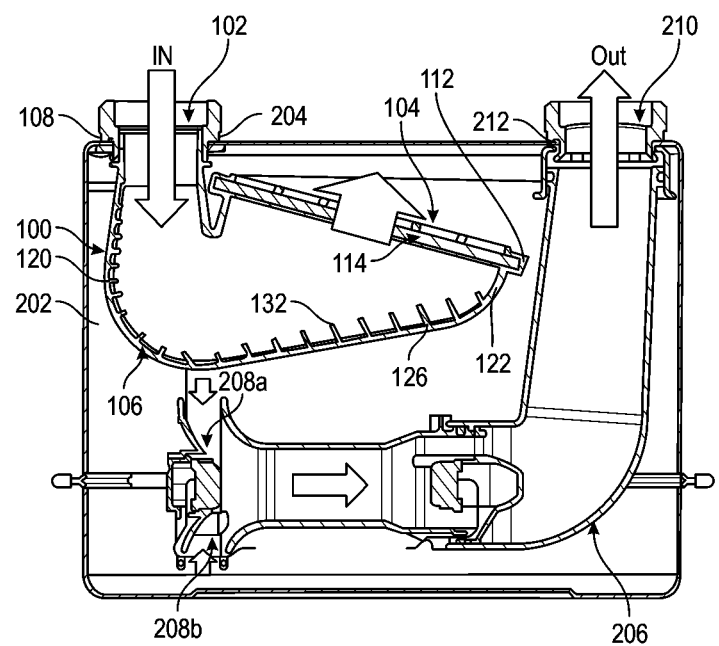
FIG. 2 is a diagram illustrating an installation of the multifunctional dust trap within a gas meter, according to an embodiment of the present mechanism.

FIG. 1A is a diagram illustrating a multifunctional dust trap 100. The multifunctional dust trap 100 may be connected to a gas meter 202 (as shown in FIG. 2) for achieving multiple functions such as, but not limited to, collecting and filtering a dust, guiding a flow of a gas, eliminating and/or reducing an acoustic noise, and so forth.

The multifunctional dust trap 100 comprises an inlet 102, an outlet 104, and a chamber 106. Further, the inlet 102, the outlet 104, and the chamber 106 may be made up of a material such as, but not limited to, a natural plastic, a synthetic plastic, a natural rubber, a synthetic rubber, a metal, and so forth. The inlet 102, the outlet 104, and the chamber 106 may be made up of any of the material known to a person skilled in the art that may provide a durability to the multifunctional dust trap 100.

The inlet 102 may be a cylindrical shaped hollow structure attached to the chamber 106 for connecting the multifunctional dust trap 100 with the gas meter 202. The inlet 102 may comprise an inlet cavity 108 on an outer surface along a circumference of the inlet 102. The inlet cavity 108 may be provided to fixedly connect the multifunctional dust trap 100 with the gas meter 202, in an embodiment of the present mechanism. In another embodiment of the present mechanism, the inlet cavity 108 may be provided to removably connect the multifunctional dust trap 100 with the gas meter 202 by using a plurality of threads (not shown).

Figure 1B:
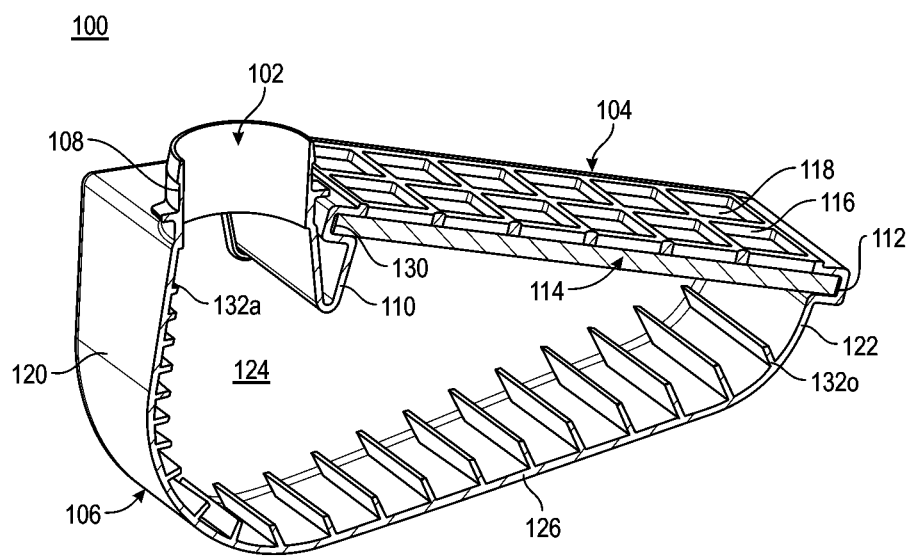
FIG. 1B is a diagram illustrating a cross sectional front view of the multifunctional dust trap, according to an embodiment of the present mechanism.

The outlet 104 may be an opening adjacent to the inlet 102, which may be provided to enable an exit of a flow of the clean gas from the chamber 106. The clean gas may be defined as a gas free from the dust and the acoustic noises that may further improve an accuracy of measurement of the meters such as, but not limited to, the gas meter 202. The outlet 104 and the inlet 102 may be connected through an inverted V-shaped cavity 110. The inverted V-shaped cavity 110 may act as a channel for guiding the flow of the gas through the chamber 106 from the inlet 102 towards the outlet 104. Further, the inverted V-shaped cavity 110 and the chamber 106 may form a frame 112 having a cavity 130 (as shown in FIG. 1B) provided on an inner surface along a perimeter of the frame 112. A shape of the frame 112 may be, but not limited to, a square, a rectangular, and so forth. Embodiments of the present mechanism may include any of the shape of the frame 112 known to a person skilled in the art. Further, the frame 112 may be capable of fixedly holding a filter 114, in an embodiment of the present mechanism. The filter 114 may be fixedly attached within the frame 112 for filtering a plurality of micro-dust particles (hereinafter referred to as the micro-dust particles) from the gas, in an embodiment of the present mechanism. In another embodiment of the present mechanism, the filter 114 may be removably attached within the frame 112 by using a snap lock mechanism.

Further, the filter 114 may comprise a plurality of filter ribs 116a-116n (hereinafter referred to as the filter ribs 116) that may be provided to support a filter pad 118. The filter ribs 116 may be made up of a material such as, but not limited to, a natural plastic, a synthetic plastic, a metal, a natural rubber, a synthetic rubber, and so forth. Embodiments of the present mechanism may include any of the material for making the filter ribs 116 known to a person skilled in the art that may be capable of providing a rigid support to the filter pad 118. Further, the filter pad 118 may be made up of a material such as, but not limited to, a fabric, a woven material, a single layer, thermally bounded Polypropylene (PP) fiber, and so forth. Embodiments of the present mechanism may include any of the material for making the filter pad 118 known to a person skilled in the art that may be capable of filtering the micro-dust particles.

The chamber 106 may comprise a first wall 120, a second wall 122, a plurality of flat walls 124a-124b (hereinafter referred to as the flat walls 124), a base 126, and a top surface 128. The first wall 120, the second wall 122, the flat walls 124, the base 126, and the top surface 128 may form a hollow enclosure of the chamber 106. The inlet 102 may be connected to the top surface 128 of the chamber 106, in an embodiment of the present mechanism. The first wall 120 may be a concave shaped wall connected between the base 126 and the top surface 128 of the chamber 106. The second wall 122 may be a concave shaped wall connected between the base 126 of the chamber 106 and the outlet 104, such that a concave face of the second wall 122 faces a concave face of the first wall 120.

FIG. 1B is a diagram illustrating a cross sectional front view of the multifunctional dust trap 100. The multifunctional dust trap 100 comprises the inlet 102, the outlet 104, and the chamber 106. The inlet 102 may be attached to the chamber 106 for connecting the multifunctional dust trap 100 with the gas meter 202 using the inlet cavity 108. The outlet 104 may be provided to enable the exit of the flow of the clean gas from the chamber 106. The outlet 104 and the inlet 102 may be connected through the inverted V-shaped cavity 110. The inverted V-shaped cavity 110 and the chamber 106 may form the frame 112 having the cavity 130 provided on the inner surface of the frame 112. Further, the frame 112 may be capable of fixedly holding the filter 114, in an embodiment of the present mechanism. The filter 114 may be attached into the frame 112 for filtering the micro-dust particles from the gas, in an embodiment of the present mechanism. Further, the filter 114 may comprise the filter ribs 116 that may be provided to support the filter pad 118.

The chamber 106 may comprise the first wall 120, the second wall 122, the flat walls 124, the base 126, and the top surface 128. The inlet 102 may be connected to the top surface 128 of the chamber 106. The base 126 may comprise a plurality of ribs 132a-132o (hereinafter referred to as the ribs 132) extending vertically in an upward direction from an inner surface of the base 126. The ribs 132 may be fixedly attached along a length of the base 126, in an embodiment of the present mechanism. In another embodiment of the present mechanism, the ribs 132 may be removably attached along the length of the base 126 using a snap lock mechanism. Further, a shape of the ribs 132 may be, but not limited to, a rectangular, a square, a triangle, a pyramid, a cuboid, and so forth. Embodiments of the present mechanism may include any of the shape of the ribs 132 known to a person skilled in the art. Further, a height of the ribs 132 may be less than $1/4$ of the height of the chamber 106, in an embodiment of the present mechanism. In another embodiment of the present mechanism, the height of the ribs 132 may be in a range of $1/12$ of the height of the chamber 106 to $1/2$ of the height of the chamber 106. Embodiments of the present mechanism may include any of the height of the ribs 132 known to a person skilled in the art that may be capable of efficiently capturing a plurality of dust particles (hereinafter referred to as the dust particles) from the gas without causing any pressure loss.

Figure 1C:
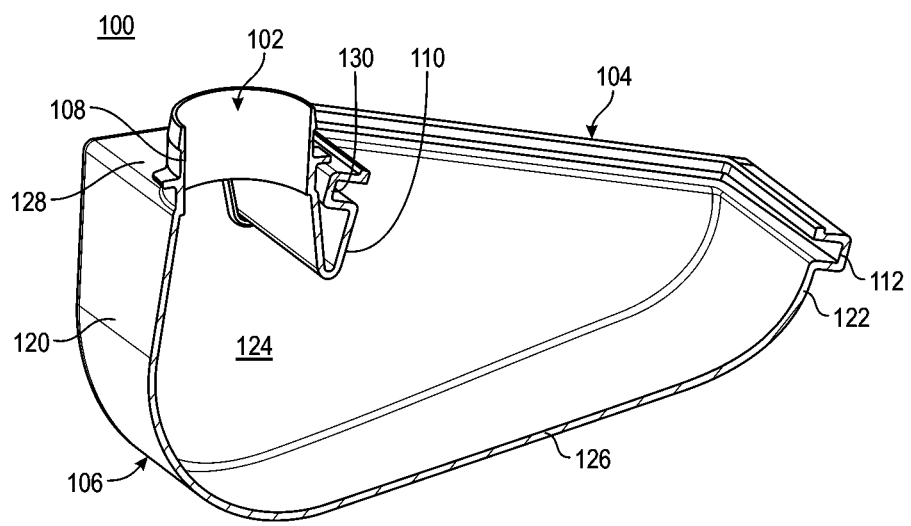
FIG. 1C is a diagram illustrating a cross sectional front view of the multifunctional dust trap with an open outlet, according to an embodiment of the present mechanism.

FIG. 1C is a diagram illustrating a cross sectional front view of the multifunctional dust trap 100 with the outlet 104 opened. The multifunctional dust trap 100 comprises the inlet 102, the outlet 104, and the chamber 106. The inlet 102 may be attached to the chamber 106 for connecting the multifunctional dust trap 100 with the gas meter 202 using the inlet cavity 108. The outlet 104 may be provided to enable the exit of the flow of the clean gas from the chamber 106. The outlet 104 and the inlet 102 may be connected through the inverted V-shaped cavity 110. The inverted V-shaped cavity 110 and the chamber 106 may form the frame 112 having the cavity 130 provided on the inner surface of the frame 112. The chamber 106 may comprise the first wall 120, the second wall 122, the flat walls 124, the base 126, and the top surface 128. The flow of the gas may enter through the inlet 102 into the chamber 106. In an embodiment of the present mechanism, a larger cross-sectional area of the chamber 106 with respect to the inlet 102 may cause a drop in a velocity of the flow of the gas. Further, the first wall 120 of the chamber 106 may guide the flow of the gas in a first direction towards a center of the chamber 106. The drop in the velocity and guiding the flow of the gas into the first direction may cause the dust particles to fall onto the base 126 of the chamber 106 due to a centrifugal force acting on the dust particles. Further, the second wall 122 of the chamber 106 may guide the flow of the gas in a second direction towards the outlet 104. The outlet 104 may enable the exit of the flow of the clean gas into the gas meter 202.

Figure 1D:
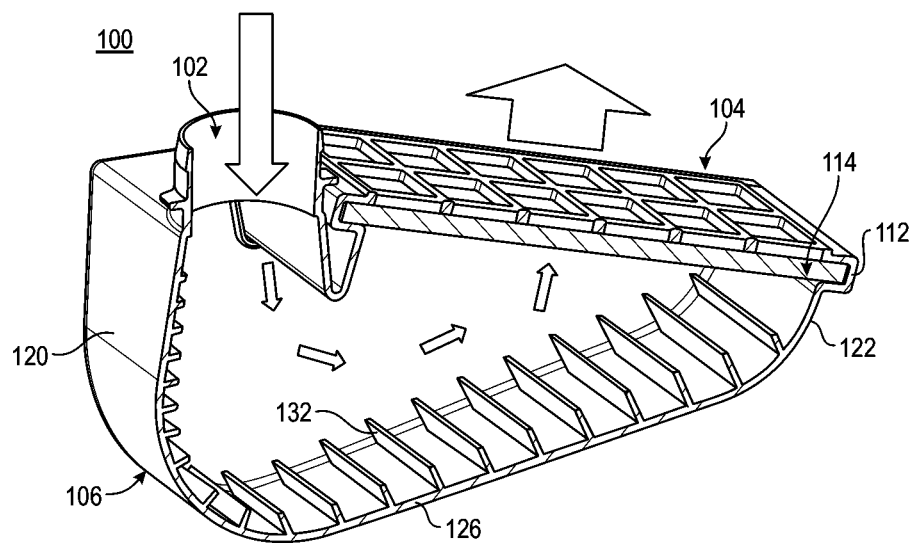
FIG. 1D is a diagram illustrating a cross-sectional front view of the multifunctional dust trap, according to an embodiment of the present mechanism.

FIG. 1D is a diagram illustrating a cross-sectional front view of the multifunctional dust trap 100. The multifunctional dust trap 100 comprises the inlet 102 attached to the chamber 106 for connecting the multifunctional dust trap 100 with the gas meter 202. The flow of the gas may enter through the inlet 102 into the chamber 106. As discussed above, the larger cross-sectional area of the chamber 106 with respect to the inlet 102 may cause the drop in the velocity of the flow of the gas. Further, the first wall 120 of the chamber 106 may guide the flow of the gas in the first direction towards the center of the chamber 106. The drop in the velocity and guiding the flow of the gas into the first direction may cause the dust particles to fall onto the base 126 of the chamber 106 due to the centrifugal force acting on the dust particles thus separating the dust particles from the gas. Further, the dust particles may get stuck into the ribs 132 running transverse a direction of the flow of the gas, according to an embodiment of the present mechanism. Furthermore, the second wall 122 of the chamber 106 may guide the flow of the gas in the second direction towards the outlet 104. The filter 114 connected within the frame 112 of the outlet 104 may filter the micro-dust particles and generate the clean gas that may exit the multifunctional dust trap 100 through the outlet 104 into the gas meter 202.

Figure 1E:
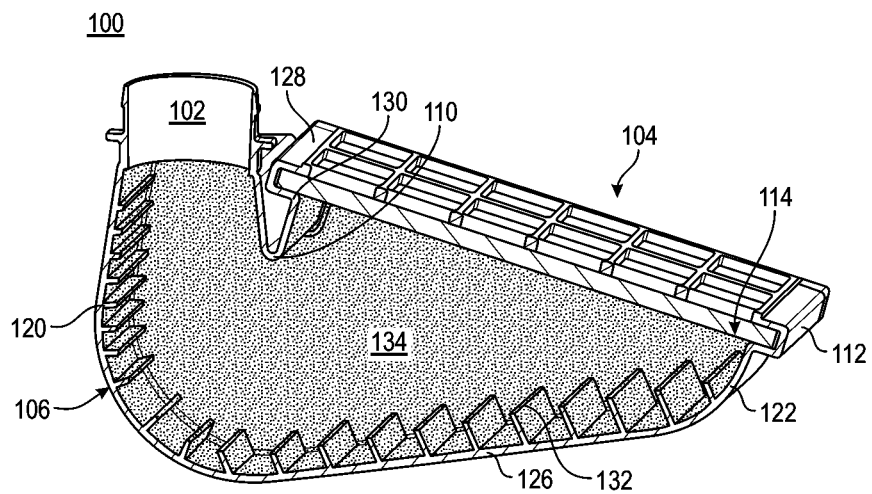
FIG. 1E is a diagram illustrating a cross-sectional front view of the multifunctional dust trap, according to another embodiment of the present mechanism.

FIG. 1E is a diagram illustrating a cross-sectional front view of the multifunctional dust trap 100, in another embodiment of the present mechanism. The multifunctional dust trap 100 comprises the inlet 102 attached to the chamber 106. The outlet 104 may be provided to enable the exit of the clean gas from the chamber 106. The outlet 104 and the inlet 102 may be connected through the inverted V-shaped cavity 110. The inverted V-shaped cavity 110 and the chamber 106 may form the frame 112 having the cavity 130 provided on the inner surface of the frame 112. Further, the frame 112 may be capable of fixedly holding the filter 114, in an embodiment of the present mechanism. The chamber 106 may comprise the first wall 120, the second wall 122, the base 126, and the top surface 128. The inlet 102 may be connected to the top surface 128 of the chamber 106. The base 126 may comprise the ribs 132 that may be attached along the length of the base 126, in an embodiment of the present mechanism. According to an embodiment of the present mechanism, an inner surface of the chamber 106 and the ribs 132 may have a coating 134 of a sticky material that may be capable of capturing the dust particles from the gas when the flow of the gas passes through the chamber 106 towards the outlet 104. The sticky material used for the coating 134 may be, but not limited to, a rubber glue, a two-component material (2K) production made up of Polybutylene Terephthalate (PBT) material, a 2K production made up of a sticky Thermoplastic Elastomers (TPE) material, a glass bond, a Polystyrene glue, a silicone glue, a Polyvinyl Acetate (PVA) glue, an epoxy, a superglue, and so forth. Embodiments of the present mechanism may include any of the sticky material for the coating 134 known to a person skilled in the art that may be capable of efficiently capturing the dust particles from the gas.

Figure 1F:
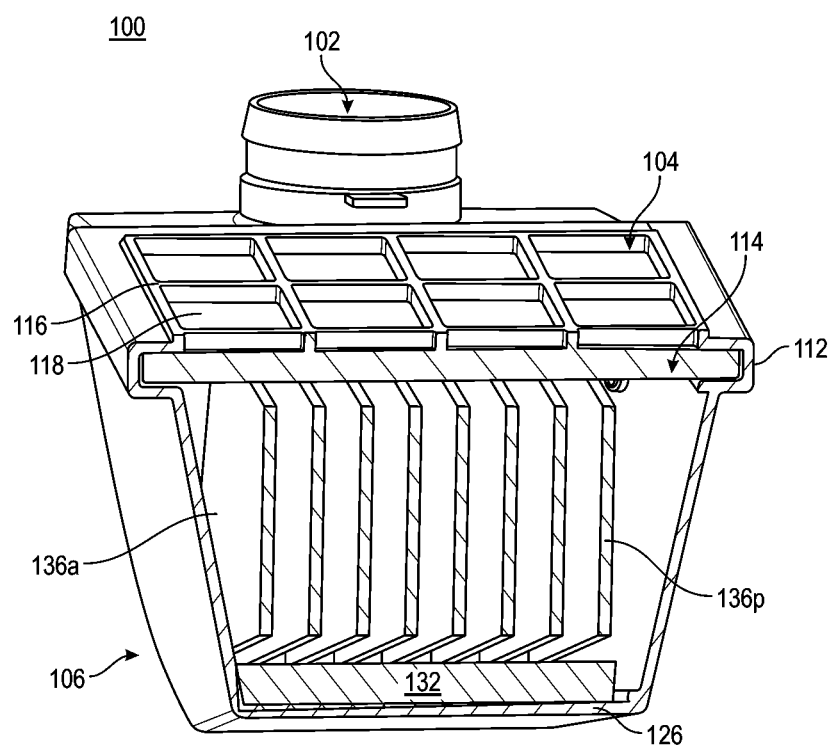
FIG. 1F is a diagram illustrating a cross sectional side view of the multifunctional dust trap, according to an embodiment of the present mechanism.

FIG. 1F is a diagram illustrating a cross-sectional side view of the multifunctional dust trap 100. The multifunctional dust trap 100 comprises the inlet 102 attached to the chamber 106. The outlet 104 may be provided to enable the exit of the clean gas from the chamber 106. The outlet 104 may comprise the frame 112 that may be capable of fixedly holding the filter 114, in an embodiment of the present mechanism. Further, the filter 114 may comprise the filter ribs 116 to support the filter pad 118. The base 126 of the chamber 106 may comprise the ribs 132 extending vertically in the upward direction from the inner surface of the base 126.

Further, the chamber 106 may comprise a plurality of conductive plates 136a-136p (hereinafter referred to as the conductive plates 136). The conductive plates 136 may be arranged parallel to each other extending vertically along the height of the chamber 106. Further, the conductive plates 136 may be connected to a power supply (not shown) that may enable the conductive plates 136 to generate an electrostatic charge. The electrostatic charge of the conductive plates 136 may attract the dust particles when the flow of the gas travels from the inlet 102 through the chamber 106 to the outlet 104. The dust particles may be, but not limited to, Iron (II, III) Oxide ($Fe_3O_4$), Ferrous Oxide (FeO), Silicone Oxide (SiO), and so forth. Embodiments of the present mechanism may include any type of the dust particles known to a person skilled in the art. In an embodiment of the present invention, the conductive plates 136 may comprise a combination of one or more negatively charged plates and one or more positively charged plates. Further, a distance between two consecutive conductive plates 136 may depend on, but not limited to, an energy of the flow of the gas used in the gas meter 202 (as shown in the FIG. 2), a maximum flow rate, and the pressure loss of the multifunctional dust trap 100, according to embodiments of the present mechanism.

Figure 1G:
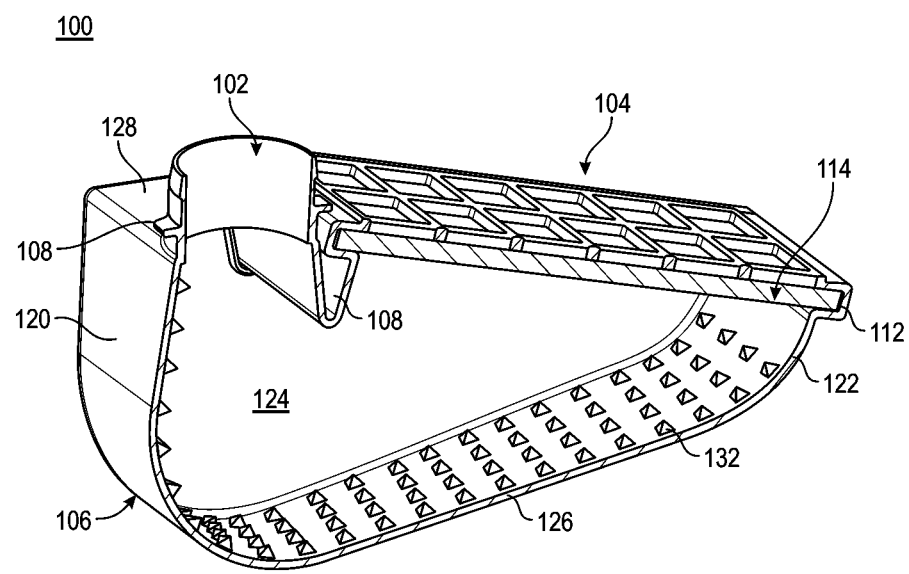
FIG. 1G is a diagram illustrating a cross-sectional front view of the multifunctional dust trap, according to an embodiment of the present mechanism.

FIG. 1G is a diagram illustrating another cross-sectional front view of the multifunctional dust trap 100. The multifunctional dust trap 100 may be made up of a special plastic material that may be capable of absorbing a part of an acoustic noise entering the multifunctional dust trap 100, in an embodiment of the present mechanism. The multifunctional dust trap 100 comprises the inlet 102, the outlet 104, and the chamber 106. The inlet 102 may be attached to the gas meter 202 (as shown in the FIG. 2) using the inlet cavity 108. The outlet 104 may be provided to enable the exit of the clean gas from the chamber 106. The inverted V-shaped cavity 110 and the chamber 106 may form the frame 112 that may be capable of fixedly holding the filter 114, in an embodiment of the present mechanism.

The base 126 may comprise the ribs 132 extending vertically in the upward direction from the inner surface of the base 126. Further, each of the ribs 132 may be in a form of for example, but not limited to, a rectangular rib, a square rib, a triangular rib, a cuboidal rib, a groove, a hole, fine additional ribs, and so forth. In an embodiment of the present mechanism, the ribs 132 may be a pyramid shaped rib. Embodiments of the present mechanism may include any shape and/or size of the ribs 132 known to a person skilled in the art. The ribs 132 may be provided to capture the dust particles from the gas when the gas flows through the chamber 106, in an embodiment of the present mechanism. In another embodiment of the present mechanism, the ribs 132 may be provided to absorb and reflect the acoustic noise that may reach the gas meter 202 (as shown in the FIG. 2) from a gas pipeline (not shown). The acoustic noise may interfere with a transducer signal in a flow tube 206 (as shown in the FIG. 2) that may affect a measuring accuracy of the flow tube 206. Further, the ribs 132 and an inner surface of the multifunctional dust trap 100 may reflect the acoustic noise each time the acoustic noise hits the inner surface or the ribs 132. The reflection may then cause a drop in a magnitude of the acoustic noise thus improving the measuring accuracy of the flow tube 206, will be explained in detail in conjunction with FIG. 2.

Figure 1H:
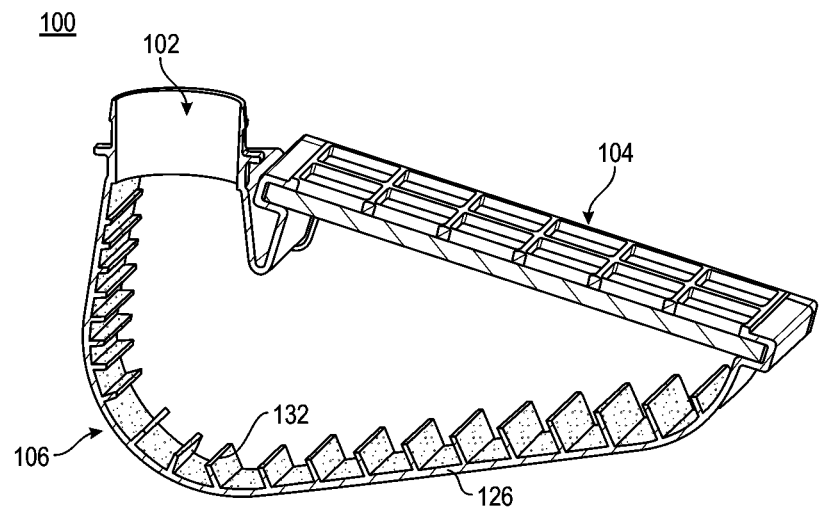
FIG. 1H is a diagram illustrating a cross-sectional front view of the multifunctional dust trap, according to another embodiment of the present mechanism.

FIG. 1H is a diagram illustrating another cross-sectional front view of the multifunctional dust trap 100, according to another embodiment of the present mechanism. The multifunctional dust trap 100 may be made up of a first material that may be capable of absorbing the acoustic noise entering the multifunctional dust trap 100. The first material may be, but not limited to, a natural plastic, a synthetic plastic, a natural rubber, a synthetic rubber, a metal, a glasball filled Polybutylene Terephthalate (PBT) material, a glasball filled Polyoxymethylene (POM) material, and so forth. Embodiments of the present mechanism may include any of the first material known to a person skilled in the art that may be capable of absorbing the acoustic noise. Further, the multifunctional dust trap 100 comprises the inlet 102 that may be attached to the gas meter 202 (as shown in the FIG. 2). The outlet 104 may be provided to enable the exit of the clean gas from the chamber 106. The base 126 may comprise the ribs 132 extending vertically in the upward direction from the inner surface of the base 126. Further, the ribs 132 and the inner surface of the multifunctional dust trap 100 may be made up of a material such as, but not limited to, the first material, a second material, a rubber, a Thermoplastic Elastomer (TPE), and so forth. According to embodiments of the present invention, the second material is a material having a different acoustic impedance than the first material. Embodiments of the present mechanism may include any of the material for the ribs 132 known to a person skilled in the art that may be capable of absorbing the acoustic noise. The material of the ribs 132 and the inner surface of the multifunctional dust trap 100 may have a different acoustic impedance than the first material that may increase an absorption of the acoustic noise. Further, the ribs 132 and the inner surface of the multifunctional dust trap 100 may reflect the acoustic noise each time the acoustic noise hits the inner surface and the ribs 132. The reflection may cause the drop in the magnitude of the acoustic noise thus improving the measuring accuracy of the flow tube 206.

Figure 1I:
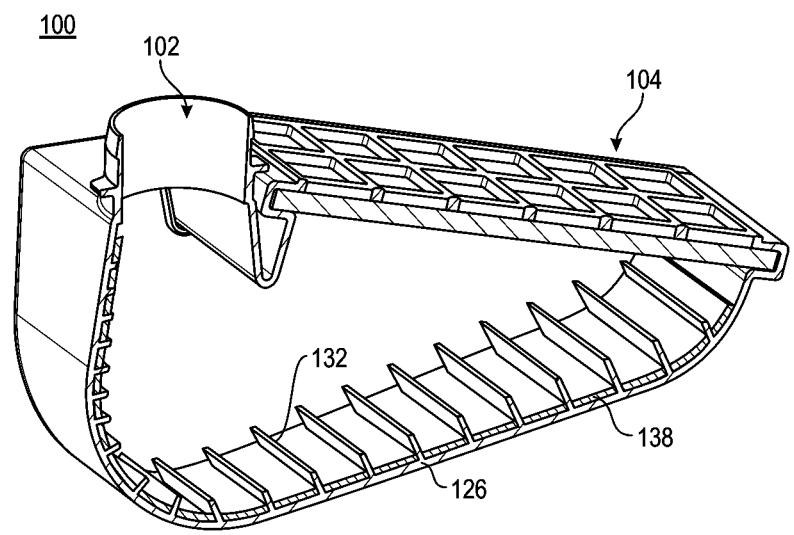
FIG. 1I is a diagram illustrating a cross-sectional front view of the multifunctional dust trap, according to another embodiment of the present mechanism.

FIG. 1I is a diagram illustrating another cross-sectional front view of the multifunctional dust trap 100. The multifunctional dust trap 100 comprises the inlet 102 and the outlet 104. The base 126 may comprise the ribs 132 extending vertically in the upward direction from the inner surface of the base 126, in an embodiment of the present mechanism. In another embodiment of the present mechanism, the base 126 may be flat (as shown in the FIG. 1C). Further, the base 126 may comprise an acoustic mat 138 having a high acoustic impedance that may be fixedly attached to the inner surface of the base 126, in an embodiment of the present mechanism. In another embodiment of the present mechanism, the acoustic mat 138 may be fixedly attached to the inner surface of the chamber 106. In yet another embodiment of the present mechanism, the acoustic mat 138 may be removably attached to the inner surface of the base 126 using a snap lock mechanism. In yet another embodiment of the present mechanism, the acoustic mat 138 may be removably attached to the inner surface of the chamber 106 using the snap lock mechanism. The ribs 132 and the acoustic mat 138 may absorb the acoustic noise that may reach the gas meter 202 (as shown in the FIG. 2) from the gas pipeline (not shown) such that an absorption rate of the multifunctional dust trap 100 may be increased. The acoustic mat 138 may be made up of an open cell Polyurethane (PUR) acoustic foam, according to an embodiment of the present mechanism.

Figure 1J:
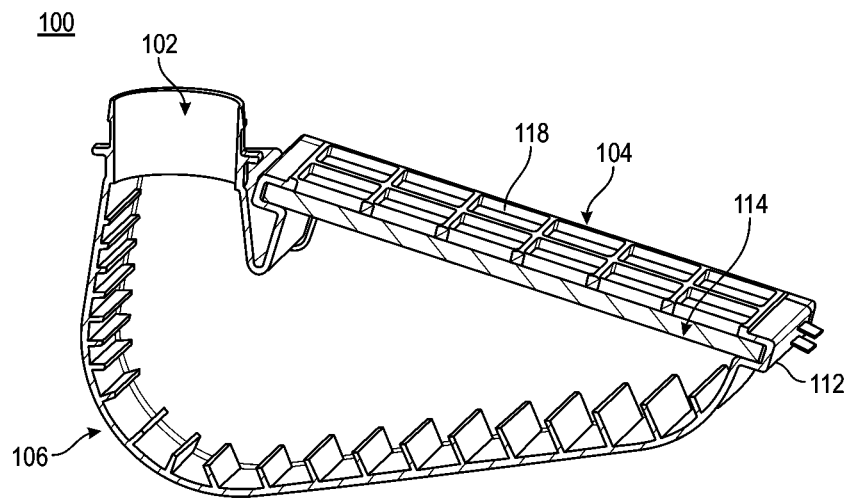
FIG. 1J is a diagram illustrating a cross-sectional front view of the multifunctional dust trap for measuring a degree of pollution, according to an embodiment of the present mechanism.

FIG. 1J is a diagram illustrating a cross-sectional front view of the multifunctional dust trap 100 for measuring a degree of pollution, in an embodiment of the present mechanism. The inlet 102 of the multifunctional dust trap 100 may be attached to the chamber 106. The outlet 104 may be provided to enable the exit of the clean gas from the chamber 106. The frame 112 at the outlet 104 may be capable of fixedly holding the filter 114, in an embodiment of the present mechanism. Further, the frame 112 may comprise an upper conductive grid (not shown), and a lower conductive grid (not shown) such that the upper conductive grid and the lower conductive grid sandwiches the filter pad 118. The upper conductive grid and the lower conductive grid may be further connected to a power source (not shown) that may be capable of enabling the upper conductive grid and the lower conductive grid to generate an electrostatic charge. The electrostatic charge may be used to measure the degree of pollution by determining an amount of dust particles collected by the filter 114. The determined degree of pollution may represent a capacity and/or a resistance of the filter 114, according to an embodiment of the present mechanism. The dust particles may be, but not limited to, Iron (II, III) Oxide ($Fe_3O_4$), Ferrous Oxide (FeO), Silicone Oxide (SiO), and so forth. The upper conductive grid and the lower conductive grid sandwiching the filter pad 118 may form a capacitor that may enable a capacitive and/or a resistance measurement of the amount of the dust particles collected by the filter pad 118 of the filter 114.

Figure 1K:
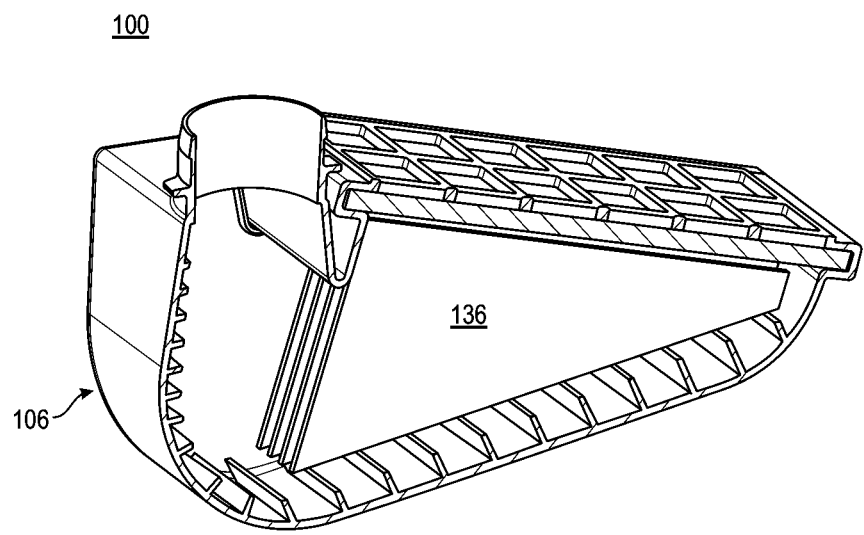
FIG. 1K is a diagram illustrating across-sectional front view of the multifunctional dust trap using a plurality of conductive plates, according to an embodiment of the present mechanism.

FIG. 1K is a diagram illustrating another cross-sectional front view of the multifunctional dust trap 100 having the conductive plates 136. The chamber 106 may comprise the conductive plates 136, in an embodiment of the present mechanism. The conductive plates 136 may be arranged parallel to each other extending vertically along the height of the chamber 106. Further, the conductive plates 136 may be connected to the power supply (not shown) that may enable the conductive plates 136 to generate the electrostatic charge. The generated electrostatic charge in the conductive plates 136 may attract the dust particles from the flow of the gas, according to an embodiment of the present mechanism.

FIG. 2 is a diagram illustrating an installation 200 of the multifunctional dust trap 100 within the gas meter 202. The multifunctional dust trap 100 comprises the inlet 102 that may be connected to a gas inlet 204 of the gas meter 202 using the inlet cavity 108. A flow of a gas may enter from through the inlet 102 into the chamber 106 of the multifunctional dust trap 100. In an embodiment of the present mechanism, a larger cross-sectional area of the chamber 106 in comparison with the inlet 102 may cause a drop in a velocity of the flow of the gas. Further, the first wall 120 of the chamber 106 may guide the flow of the gas in a first direction towards a center of the chamber 106. The drop in the velocity and the change in the direction of the flow of the gas may cause the dust particles to fall onto the base 126 of the chamber 106 due to the centrifugal force acting on the dust particles thus separating the dust particles from the gas. Further, the dust particles may get stuck into the ribs 132 running transverse the direction of the flow of the gas, according to an embodiment of the present mechanism. The second wall 122 of the chamber 106 may further guide the flow of the gas in a second direction towards the outlet 104. The filter 114 connected within the frame 112 of the outlet 104 may filter the micro-dust particles and enable the flow of the clean gas to exit the multifunctional dust trap 100 through the outlet 104 into the gas meter 202. Further, the clean flow of the gas may enter a flow tube 206 installed within the gas meter 202. The flow tube 206 may comprise a plurality of flow inlets 208a-208b (hereinafter referred to as the flow inlets 208) for enabling the flow of the gas into the flow tube 206. The outlet 104 of the multifunctional dust trap 100 may direct the clean flow of the gas away from the flow inlets 208 of the flow tube 206 to enable a smooth flow within the flow tube 206 by providing a balanced flow of the clean gas into the flow tube 206. Further, an outlet 210 of the flow tube 206 may be connected to the gas outlet 212 of the gas meter 202 that may be further connected to a gas pipeline (not shown).

Figure 3A:
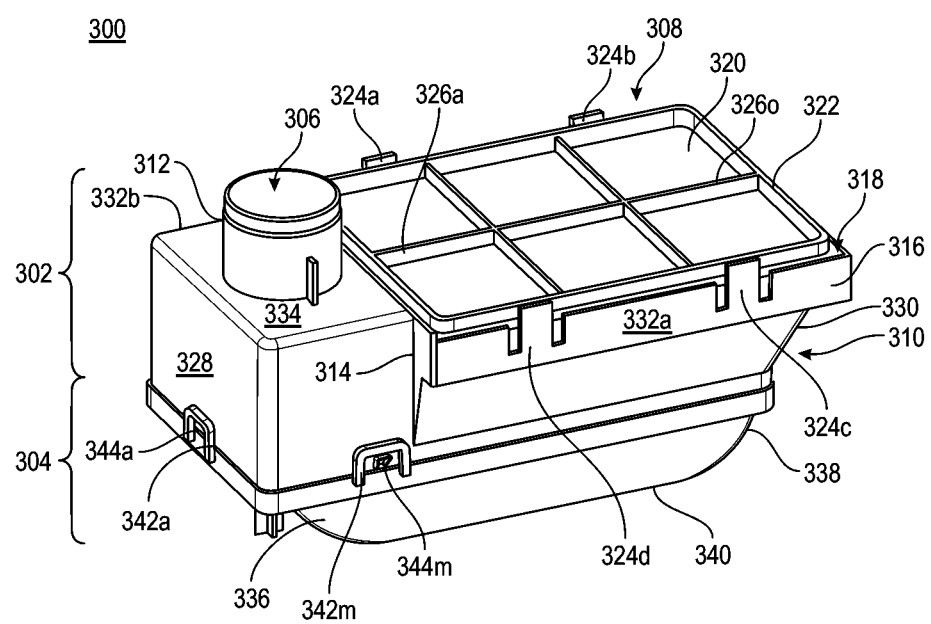
FIG. 3A is a diagram illustrating a front view of a multifunctional dust trap, according to another embodiment of the present mechanism.
Figure 4:
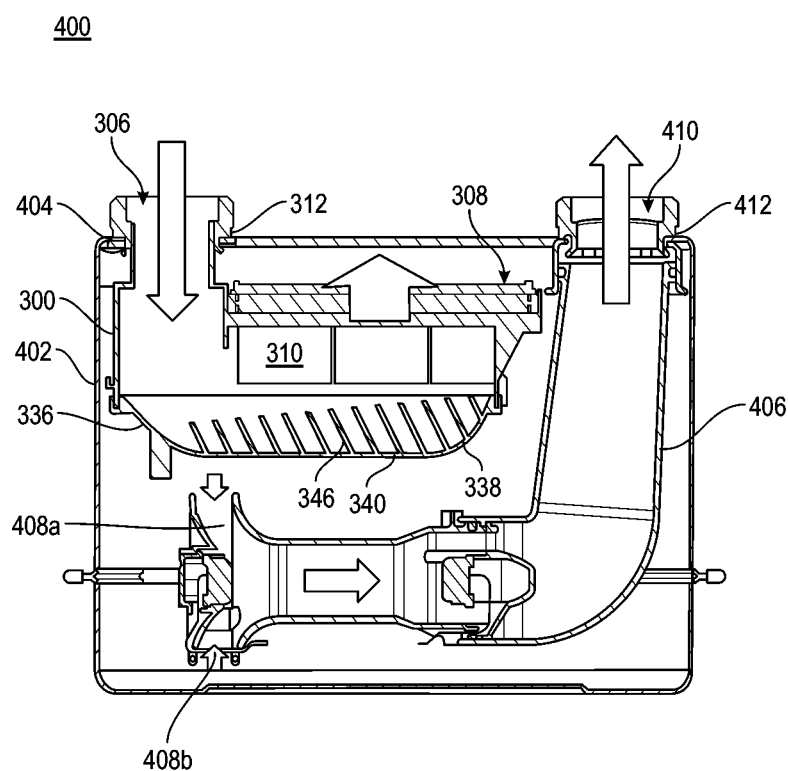
FIG. 4 is a diagram illustrating an installation of the multifunctional dust trap within the gas meter, according to an embodiment of the present mechanism.

FIG. 3A is a diagram illustrating a front view of a multifunctional dust trap 300, according to another embodiment of the present mechanism. The multifunctional dust trap 300 may be connected to a gas meter 402 (as shown in FIG. 4) for achieving multiple functions such as, but not limited to, collecting and filtering a plurality of dust particles (hereinafter referred to as the dust particles), guiding a flow of a gas, eliminating an acoustic noise, and so forth. The multifunctional dust trap 300 comprises a top part 302, and a bottom part 304. Further, the top part 302, and the bottom part 304 may be made up of a material such as, but not limited to, a natural plastic, a synthetic plastic, a natural rubber, a synthetic rubber, a metal, and so forth. The top part 302, and the bottom part 304 may be made up of any of the material known to a person skilled in the art that may provide a durability to the multifunctional dust trap 300.

The top part 302 may comprise an inlet 306, an outlet 308, and an upper chamber 310. The inlet 306 may be a cylindrical shaped hollow structure attached to the upper chamber 310 for connecting the multifunctional dust trap 300 with the gas meter 402. The inlet 306 may comprise an inlet cavity 312 on an outer surface along a circumference of the inlet 306 to fixedly connect the multifunctional dust trap 300 with the gas meter 402, in an embodiment of the present mechanism. In another embodiment of the present mechanism, the inlet cavity 312 may be provided to removably connect the multifunctional dust trap 300 with the gas meter 402 by using a plurality of threads (not shown).

The outlet 308 may be an opening adjacent to the inlet 306, which may be provided to enable an exit of a flow of a clean gas from the upper chamber 310. The flow of the clean gas may be free from the dust particles that may improve an accuracy of a measurement of the gas meter 402. The outlet 308 and the inlet 306 may be connected through a vertical wall 314. The vertical wall 314 may act as a channel for guiding the flow of the gas through the upper chamber 310 from the inlet 306 towards the outlet 308. Further, the vertical wall 314 and the upper chamber 310 may form a frame 316 having a cavity 318 provided on an inner surface along a perimeter of the frame 316. A shape of the frame 316 may be, but not limited to, a square, a rectangular, and so forth. Embodiments of the present mechanism may include any of the shape of the frame 316 known to a person skilled in the art. Further, the frame 316 may be capable of fixedly holding a filter pad 320, in an embodiment of the present mechanism. The filter pad 320 may be fixedly attached within the frame 316 for filtering a plurality of micro-dust particles (hereinafter referred to as the micro-dust particles) from the gas, in an embodiment of the present mechanism. Further, the filter pad 320 may be made up of a material such as, but not limited to, a fabric, a woven material, a single layer thermally bounded Polypropylene (PP) fiber, and so forth. Embodiments of the present mechanism may include any of the material for making the filter pad 320 known to a person skilled in the art that may be capable of filtering the micro-dust particles.

The frame 316 may further comprise a cover 322 that may be fixedly attached onto the filter pad 320 to hold the filter pad 320 within the frame 316, in an embodiment of the present mechanism. In another embodiment of the present mechanism, the cover 322 may be removably attached onto the filter pad 320 using a plurality of clips 324a-324d (hereinafter referred to as the clips 324). The clips 324 may be designed to snap and lock the filter pad 320 within the frame 316 using the cover 322. Further, the cover 322 may comprise a plurality of supports 326a-326n (hereinafter referred to as the supports 326) connected to each other forming a grid like structure to cover the filter pad 320. The cover 322 may be made up of a material such as, but not limited to, a natural plastic, a Polybutylene Terephthalate (PBT) material, a Thermoplastic elastomers (TPE), and so forth. Embodiments of the present mechanism may include any of the material for making the cover 322 known to a person skilled in the art that may be capable of providing a durability to the cover 322.

The upper chamber 310 may comprise a first wall 328, a second wall 330, a plurality of side walls 332a-332b (hereinafter referred to as the side walls 332), and a top surface 334. The first wall 328, the second wall 330, the side walls 332, and the top surface 334 may form a hollow enclosure defining the upper chamber 310. The inlet 306 may be connected to the top surface 334 of the upper chamber 310, in an embodiment of the present mechanism. The first wall 328 may be a flat wall extending vertically in a downward direction from the top surface 334. The second wall 330 may be a slanted wall extending vertically in a downward direction from the frame 316. The bottom part 304 may comprise a first wall 336, a second wall 338, and a base 340. The first wall 336 and the second wall 338 may be a concave shaped wall designed to guide the flow of the gas from the inlet 306 to the outlet 308. Further, the bottom part 304 may comprise a plurality of locking mechanism 342a-342m (hereinafter referred to as the locking mechanism 342) that may be capable of fixedly engaging the bottom part 304 with the top part 302. The locking mechanism 342 may be a snap lock mechanism that may engage with a plurality of protrusions 344a-344m (hereinafter referred to as the protrusions 344) provided on the side wall 330 of the upper chamber 310, in an embodiment of the present mechanism.

Figure 3B:
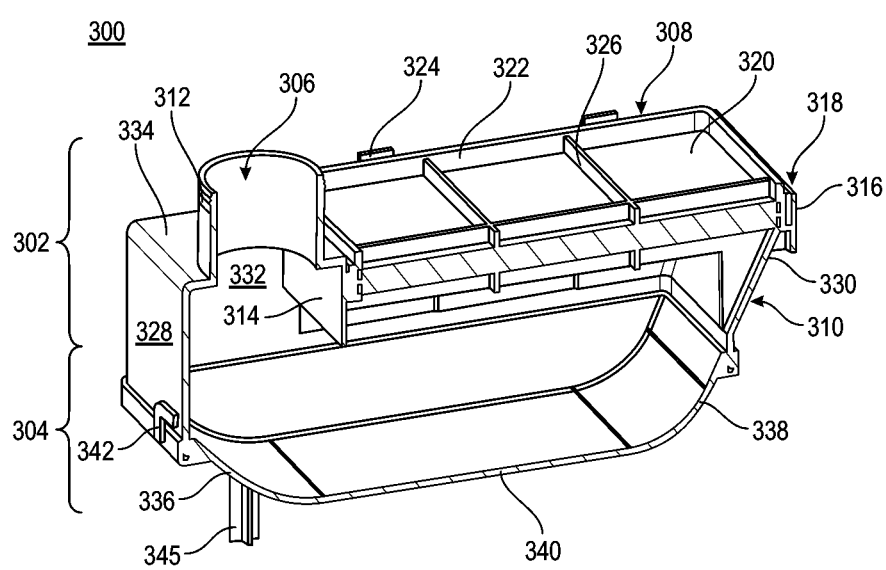
FIG. 3B is a diagram illustrating a cross-sectional front view of the multifunctional dust trap, according to another embodiment of the present mechanism.

FIG. 3B is a diagram illustrating a cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310 as discussed above. The inlet 306 may comprise the inlet cavity 312 to fixedly connect the multifunctional dust trap 300 with the gas meter 402 (as shown in the FIG. 4).

The outlet 308 may be provided to enable the exit of the flow of the clean gas from the upper chamber 310. The outlet 308 and the inlet 306 may be connected through the vertical wall 314. The vertical wall 314 may act as the channel for guiding the flow of the gas through the upper chamber 310 from the inlet 306 towards the outlet 308. Further, the multifunctional dust trap 300 may comprise the frame 316 having the cavity 318 to fixedly hold the filter pad 320, in an embodiment of the present mechanism. The frame 316 may further comprise the cover 322 that may be fixedly attached onto the filter pad 320 to hold the filter pad 320 within the frame 316, in an embodiment of the present mechanism. In another embodiment of the present mechanism, the cover 322 may be removably attached onto the filter pad 320 using the clips 324. Further, the cover 322 may comprise the supports 326 connected to each other forming the grid like structure to cover the filter pad 320.

The upper chamber 310 may comprise the first wall 328, the second wall 330, the side walls 332, and the top surface 334. The inlet 306 may be connected to the top surface 334 of the upper chamber 310, in an embodiment of the present mechanism. The bottom part 304 may comprise the first wall 336, the second wall 338, and the base 340. The first wall 336 and the second wall 338 may be the concave shaped wall designed to guide the flow of the gas from the inlet 306 to the outlet 308. Further, the bottom part 304 may comprise the locking mechanism 342 that may be capable of fixedly engaging the bottom part 304 with the top part 302. Further, the bottom part 304 may comprise a stem 345 that may extend vertically in a downward direction from the bottom part 304. The stem 345 may be a cylindrical shaped structure connected to the first wall 336 of the bottom part 304, according to an embodiment of the present mechanism.

Figure 3C:
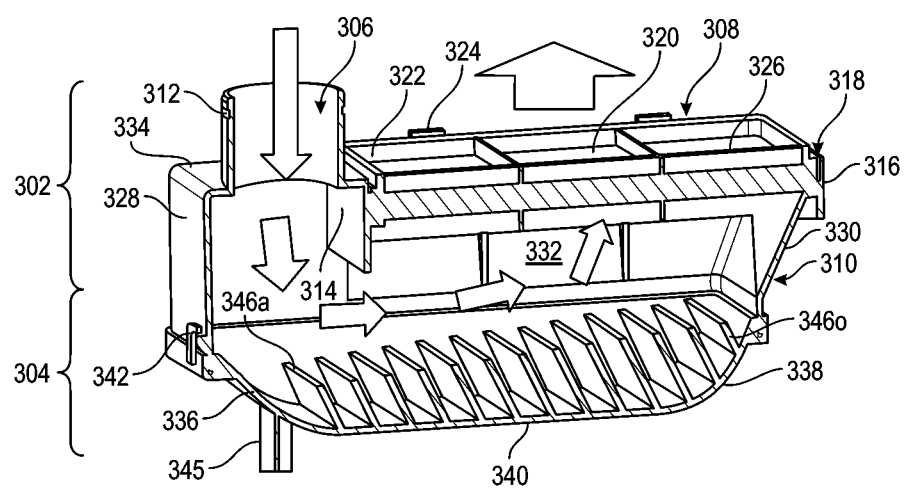
FIG. 3C is a diagram illustrating a cross-sectional front view of the multifunctional dust trap to illustrate a direction of flow gas, according to another embodiment of the present mechanism.

FIG. 3C is a diagram illustrating a cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310. The inlet 306 may comprise the inlet cavity 312 to fixedly connect the multifunctional dust trap 300 with the gas meter 402 (as shown in the FIG. 4).

The outlet 308 may be provided to enable the exit of the flow of the clean gas from the upper chamber 310. The outlet 308 and the inlet 306 may be connected through the vertical wall 314. The vertical wall 314 may act as the channel for guiding the flow of the gas through the upper chamber 310 from the inlet 306 towards the outlet 308. Further, the multifunctional dust trap 300 may comprise the frame 316 having the cavity 318 to fixedly hold the filter pad 320, in an embodiment of the present mechanism. The frame 316 may further comprise the cover 322 that may be fixedly attached onto the filter pad 320 to hold the filter pad 320 within the frame 316, in an embodiment of the present mechanism. In another embodiment of the present mechanism, the cover 322 may be removably attached onto the filter pad 320 using the clips 324. Further, the cover 322 may comprise the supports 326 connected to each other forming the grid like structure to cover the filter pad 320.

The upper chamber 310 may comprise the first wall 328, the second wall 330, the side walls 332, and the top surface 334. The inlet 306 may be connected to the top surface 334 of the upper chamber 310, in an embodiment of the present mechanism. The bottom part 304 may comprise the first wall 336, the second wall 338, and the base 340. The first wall 336 and the second wall 338 may be the concave shaped wall designed to guide the flow of the gas from the inlet 306 to the outlet 308. Further, the bottom part 304 may comprise the locking mechanism 342 that may be capable of fixedly engaging the bottom part 304 with the top part 302. Further, the bottom part 304 may comprise a stem 345 that may extend vertically in a downward direction from the bottom part 304. The stem 345 may be a cylindrical shaped structure connected to the first wall 336 of the bottom part 304, according to an embodiment of the present mechanism. Further, the base 340 may comprise a plurality of ribs 346a-346o (hereinafter referred to as the ribs 346) extending vertically in an upward direction from an inner surface of the base 340. The ribs 346 may be fixedly attached along a length of the base 340, in an embodiment of the present mechanism. In another embodiment of the present mechanism, the ribs 346 may be removably attached along the length of the base 340 using a snap lock mechanism. Further, a shape of the ribs 346 may be, but not limited to, a rectangular, a square, a triangle, a pyramid, a cuboid, and so forth. Embodiments of the present mechanism may include any of the shape of the ribs 346 known to a person skilled in the art. Further, the ribs 346 and the inner surface of the multifunctional dust trap 300 may be made up of a material such as, but not limited to, the first material, the second material, a rubber, a Thermoplastic Elastomer (TPE), and so forth. Embodiments of the present mechanism may include any of the material for the ribs 346 known to a person skilled in the art that may be capable of absorbing the acoustic noise. According to an embodiment of the present mechanism, a height of the ribs 346 near the first wall 336 may be shorter than the height of the ribs 346 near the second wall 338 of the bottom part 304 such that the ribs 346 form an incremental slope from the first wall 336 towards the second wall 338 for guiding the flow of the gas towards the outlet 308, in an embodiment of the present mechanism. Furthermore, the ribs 346 may be capable of efficiently capturing a plurality of dust particles (hereinafter referred to as the dust particles) from the gas without causing any pressure loss.

Further, the flow of the gas may enter through the inlet 306 into the upper chamber 310. The upper chamber 310 may have a larger cross-sectional area with respect to the inlet 306 that may cause a drop in a velocity of the flow of the gas. Further, the first wall 336 of the bottom part 304 may guide the flow of the gas in a first direction towards a center of the upper chamber 310. The drop in the velocity and guiding the flow of the gas into the first direction may cause the dust particles to fall onto the base 340 of the bottom part 304 due to a centrifugal force acting on the dust particles thus separating the dust particles from the gas. Further, the dust particles may get stuck into the ribs 346 running transverse a direction of the flow of the gas, according to an embodiment of the present mechanism. Furthermore, the second wall 338 of the bottom part 304 may guide the flow of the gas in the second direction towards the outlet 308. The filter pad 320 connected within the frame 316 of the outlet 308 may filter the micro-dust particles and generate the clean gas that may exit the multifunctional dust trap 300 through the outlet 308.

Figure 3D:
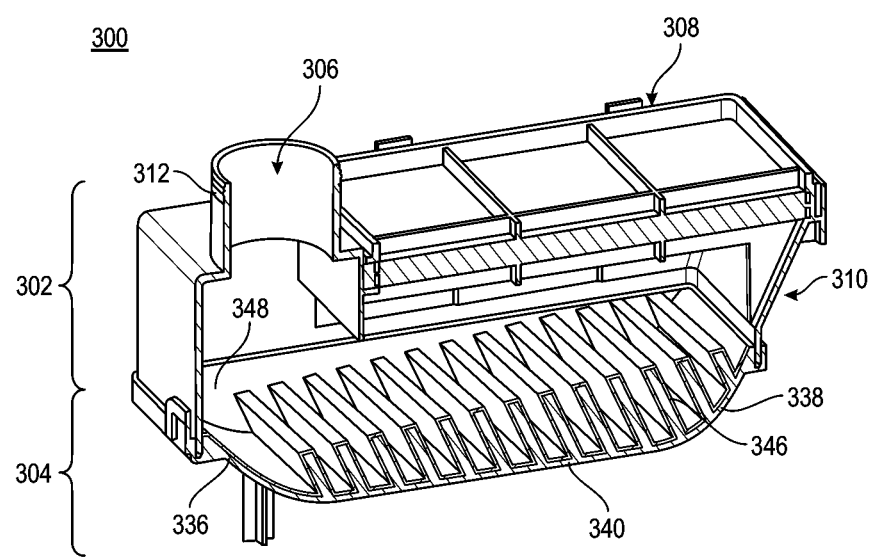
FIG. 3D is a diagram illustrating a cross-sectional front view of the multifunctional dust trap, according to another embodiment of the present mechanism.

FIG. 3D is a diagram illustrating another cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310. The inlet 306 may comprise the inlet cavity 312 to fixedly connect the multifunctional dust trap 300 with the gas meter 402 (as shown in the FIG. 4).

The bottom part 304 may comprise the first wall 336, the second wall 338, and the base 340. Further, the base 340 may comprise the ribs 346 extending vertically in the upward direction from the inner surface of the base 340. According to an embodiment of the present mechanism, the inner surface of the base 340 and the ribs 346 may have a coating 348 of a sticky material that may be capable of capturing the dust particles from the gas when the flow of the gas passes through the multifunctional dust trap 300 from the inlet 306 towards the outlet 308. The sticky material used for the coating 348 may be, but not limited to, a rubber glue, a 2K production made up of Polybutylene Terephthalate (PBT) material, a 2K production made up of a sticky Thermoplastic Elastomers (TPE) material, a glass bond, a Polystyrene glue, a silicone glue, a Polyvinyl Acetate (PVA) glue, an epoxy, a superglue, and so forth. Embodiments of the present mechanism may include any of the sticky material for the coating 348 known to a person skilled in the art that may be capable of efficiently capturing the dust particles from the gas.

Figure 3E:
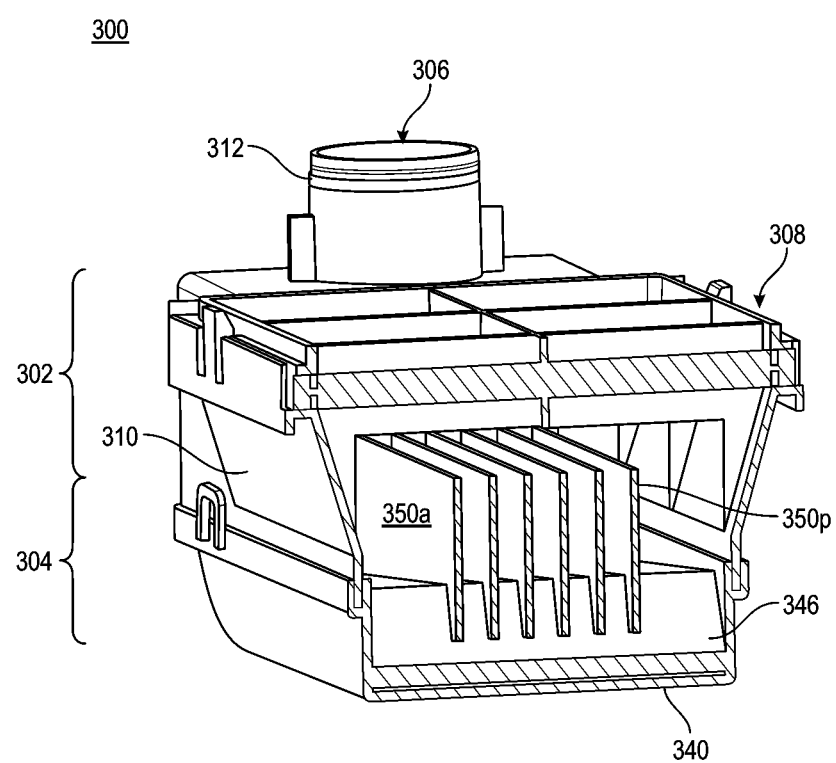
FIG. 3E is a diagram illustrating a cross sectional side view of the multifunctional dust trap, according to another embodiment of the present mechanism.

FIG. 3E is a diagram illustrating a cross sectional side view of the multifunctional dust trap 300, according to yet another embodiment of the present mechanism. The multifunctional dust trap 300 comprises the top part 302, and the bottom part 304, as discussed above. The top part 302 may comprise the inlet 306, the outlet 308, and the upper chamber 310. The inlet 306 may comprise the inlet cavity 312 to fixedly connect the multifunctional dust trap 300 with the gas meter 402 (as shown in the FIG. 4).

The base 340 of the bottom part 304 may comprise the ribs 346 extending vertically in the upward direction from the inner surface of the base 340. Further, the bottom part 304 may comprise a plurality of conductive plates 350a-350p (hereinafter referred to as the conductive plates 350). The conductive plates 350 may be arranged parallel to each other extending vertically along a height of the upper chamber 310 through the ribs 346. Further, the conductive plates 350 may be connected to a power supply (not shown) that may enable the conductive plates 350 to generate an electrostatic charge. The generated electrostatic charge of the conductive plates 350 may attract the dust particles when the flow of the gas travels from the inlet 306 through the multifunctional dust trap 300 towards the outlet 308. The dust particles may be, but not limited to, Iron (II, III) Oxide ($Fe_3O_4$), Ferrous Oxide (FeO), Silicone Oxide (SiO), and so forth. Embodiments of the present mechanism may include any type of the dust particles known to a person skilled in the art. In an embodiment of the present invention, the conductive plates 350 may comprise a combination of one or more negatively charged plates and one or more positively charged plates. Further, a distance between two consecutive conductive plates 350 may depend on, but not limited to, an energy of the flow of the gas used in the gas meter 402, a maximum flow rate, and the pressure loss of the multifunctional dust trap 300, according to embodiments of the present invention.

Figure 3F:
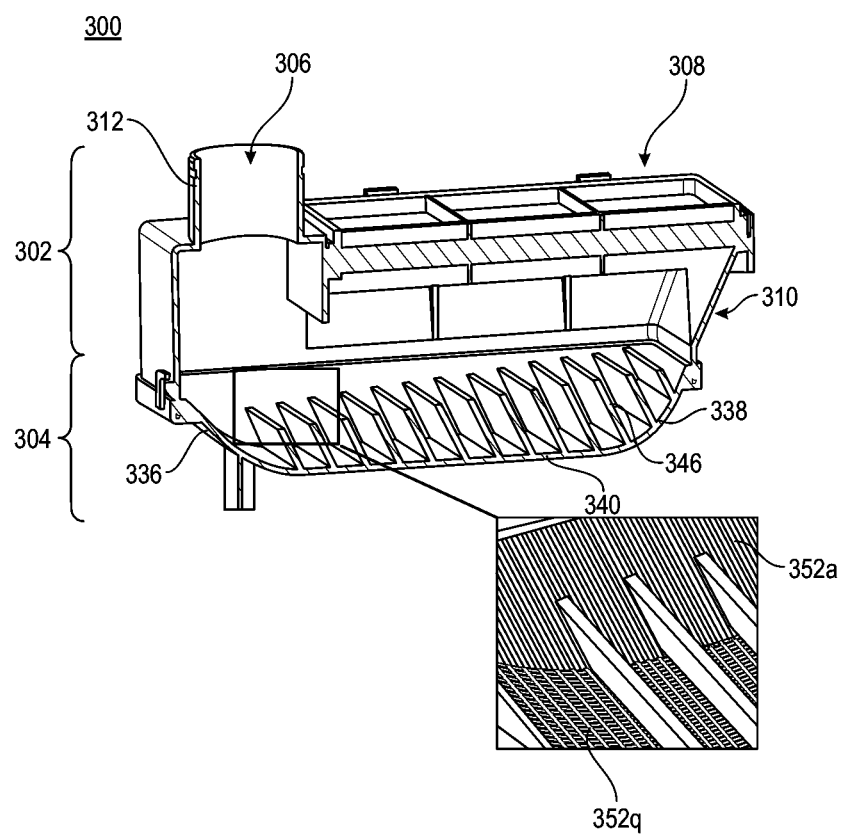
FIG. 3F is a diagram illustrating a cross-sectional front view of the multifunctional dust trap, according to another embodiment of the present mechanism.

FIG. 3F is a diagram illustrating another cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310, as discussed. The inlet 306 may comprise the inlet cavity 312 to fixedly connect the multifunctional dust trap 300 with the gas meter 402 (as shown in the FIG. 4). The bottom part 304 may comprise the first wall 336, the second wall 338, and the base 340. The first wall 336 and the second wall 338 may be the concave shaped wall designed to guide the flow of the gas from the inlet 306 to the outlet 308. Further, the base 340 may comprise the ribs 346 extending vertically in the upward direction from the inner surface of the base 340. The ribs 346 may be capable of capturing the dust particles from the gas without causing too high pressure loss. The multifunctional dust trap 300 may be made up of a material that may be capable of absorbing the acoustic noise entering the multifunctional dust trap 300. The material may be, but not limited to, a glasball filled PBT material, a glasball filled Polyoxymethylene (POM) material, and so forth. Embodiments of the present mechanism may include any of the material known to a person skilled in the art that may be capable of absorbing the acoustic noise.

Further, the ribs 346 and the inner surface of the multifunctional dust trap 300 may reflect and/or absorb the acoustic noise each time the acoustic noise hits the inner surface and the ribs 346. The reflection and/or absorption may cause the drop in the magnitude of the acoustic noise thus improving the measuring accuracy of the gas meter 402. Further, the inner surface of the base 340 of the bottom part 304 may comprise a plurality of structures 352a-352q (hereinafter referred to as the structures 352) for increasing the reflection and absorption of the acoustic noise. The structures 352 may include inequalities such as, but not limited to, a groove, a hole, a fine rib, and so forth. Embodiments of the present mechanism may include any of the inequalities known to a person skilled in the art that may be capable of absorbing the acoustic noise.

Figure 3G:
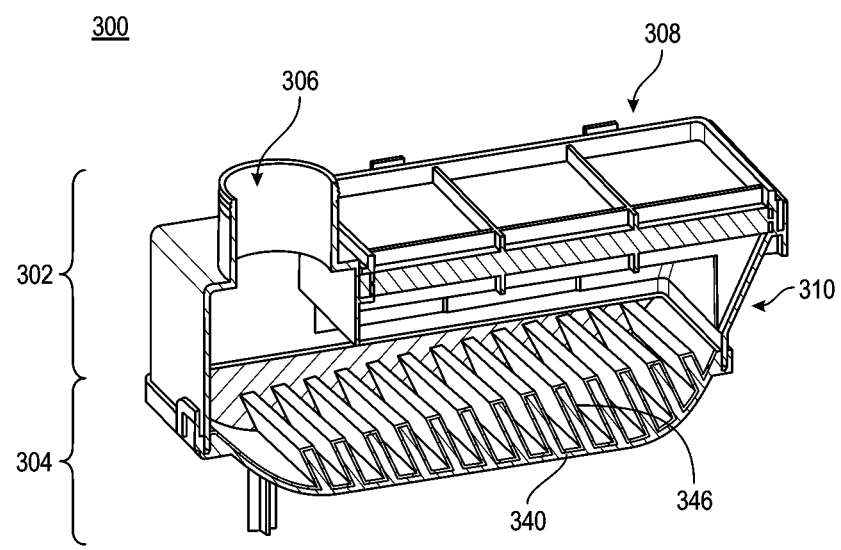
FIG. 3G is a diagram illustrating a cross-sectional front view of the multifunctional dust trap, according to another embodiment of the present mechanism.

FIG. 3G is a diagram illustrating a cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310. The base 340 of the bottom part 304 may comprise the ribs 346 extending vertically in the upward direction from the inner surface of the base 340. The ribs 346 may be capable of capturing the dust particles from the gas without causing too high pressure loss and reflecting the acoustic noise reaching the multifunctional dust trap 300 from the pipeline. The multifunctional dust trap 300 may be made up of a first material that may be capable of absorbing the acoustic noise entering the multifunctional dust trap 300, in an embodiment of the present mechanism. The first material may be a PBT material. Further, the ribs 346 and the inner surface of the multifunctional dust trap 300 may be made up of a second material that may be a Thermoplastic Elastomer (TPE) material. The second material of the ribs 346 and the inner surface of the multifunctional dust trap 300 may have a different acoustic impedance than the first material that may increase an absorption of the acoustic noise. Further, the ribs 346 and the inner surface of the multifunctional dust trap 300 may reflect the acoustic noise each time the acoustic noise hits the inner surface and the ribs 346. The reflection may cause the drop in the magnitude of the acoustic noise thus improving the measuring accuracy of the gas meter 402.

Figure 3H:
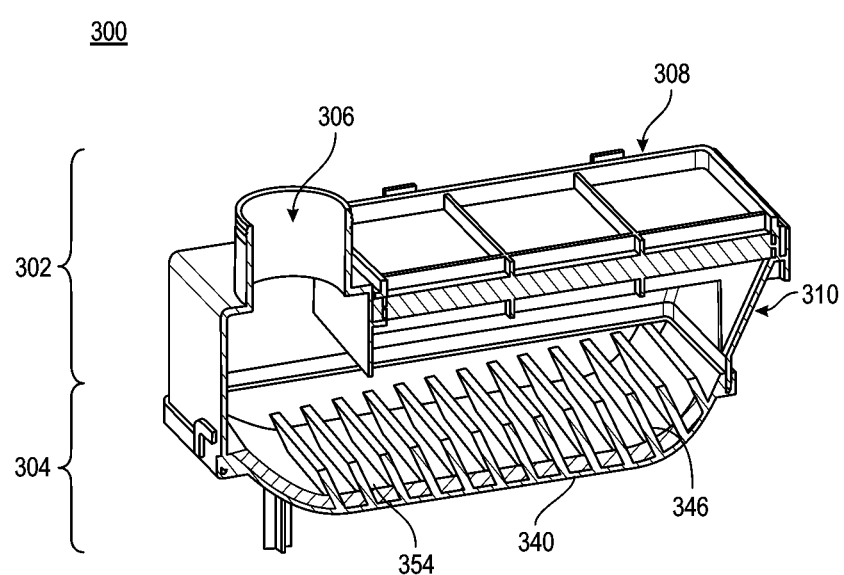
FIG. 3H is a diagram illustrating a cross-sectional front view of the multifunctional dust trap, according to another embodiment of the present mechanism.

FIG. 3H is a diagram illustrating a cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310. The base 340 of the bottom part 304 may comprise the ribs 346 extending vertically in the upward direction from the inner surface of the base 340. The ribs 346 may be capable of efficiently reflecting the acoustic noise reaching the multifunctional dust trap 300 from the pipeline. Further, the base 340 may comprise an acoustic mat 354 having a high acoustic impedance that may be fixedly attached to the inner surface of the base 340, an inner surface of the upper chamber 310 and an inner surface of the bottom part 304, in an embodiment of the present mechanism. In another embodiment of the present mechanism, the acoustic mat 354 may be removably attached to the inner surface of the base 340, the inner surface of the upper chamber 310 and the inner surface of the bottom part 304 using a snap lock mechanism. The ribs 346 and the acoustic mat 354 may absorb the acoustic noise that may reach the gas meter 402 (as shown in the FIG. 2) from the pipeline (not shown) such that an absorption rate of the multifunctional dust trap 300 may be increased. The acoustic mat 354 may be made up of an open cell Polyurethane (PUR) acoustic foam, according to an embodiment of the present mechanism.

Figure 3I:
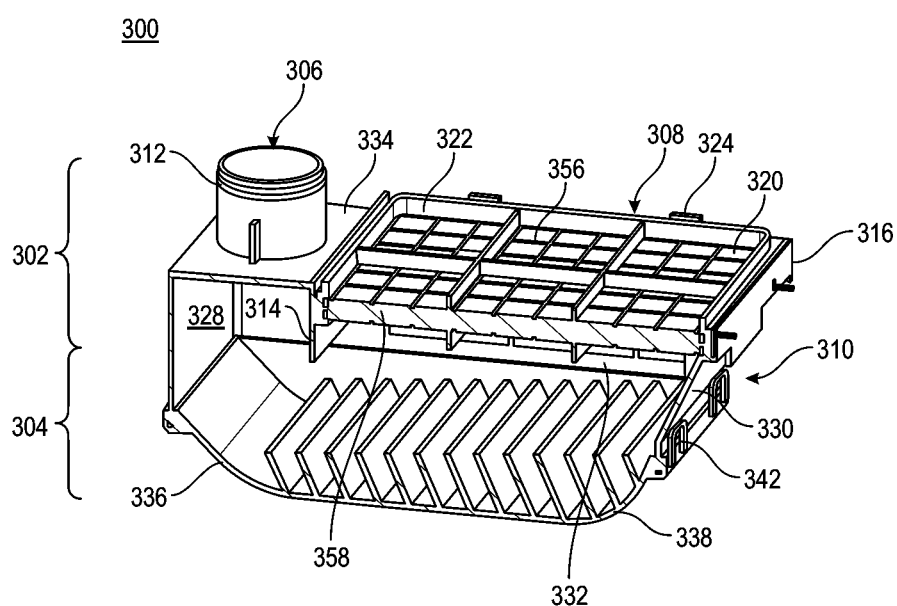
FIG. 3I is a diagram illustrating a cross-sectional front view of the multifunctional dust trap, according to an embodiment of the present mechanism.

FIG. 3I is a diagram illustrating a cross-sectional front view of the multifunctional dust trap 300, according to another embodiment of the present mechanism. The multifunctional dust trap 300 comprises the top part 302, and the bottom part 304. The top part 302 may comprise the inlet 306, the outlet 308, and the upper chamber 310. The inlet 306 may comprise the inlet cavity 312 on the outer surface along the circumference of the inlet 306 to fixedly connect the multifunctional dust trap 300 with the gas meter 402 (as shown in the FIG. 4), in an embodiment of the present mechanism. The outlet 308 and the inlet 306 may be connected through the vertical wall 314. The vertical wall 314 and the upper chamber 310 may form the frame 316 for fixedly holding the filter pad 320, in an embodiment of the present mechanism. Further, the frame 316 may comprise the upper conductive grid 356, and the lower conductive grid 358 such that the upper conductive grid 356 and the lower conductive grid 358 sandwiches the filter pad 320. The upper conductive grid 356 and the lower conductive grid 358 may be further connected to a power source (not shown) that may be capable of enabling the upper conductive grid 356 and the lower conductive grid 358 to generate an electrostatic charge. The generated electrostatic charge may be used to generate data representing an amount of the micro-dust particles collected by the filter pad 320. The upper conductive grid 356 and the lower conductive grid 358 sandwiching the filter pad 320 may form a capacitor that may enable a capacitive and/or a resistance measurement of the amount of the micro-dust particles collected by the filter pad 320. The frame 316 may further comprise the cover 322 that may be fixedly attached onto the upper conductive grid 356 to hold the upper conductive grid 356 and the filter pad 320 within the frame 316, in an embodiment of the present mechanism. In another embodiment of the present mechanism, the cover 322 may be removably attached onto the upper conductive grid 356 using the clips 324.

The upper chamber 310 may comprise the first wall 328, the second wall 330, the side walls 332, and the top surface 334. The first wall 328, the second wall 330, the side walls 332, and the top surface 334 may form a hollow enclosure defining the upper chamber 310. The bottom part 304 may comprise the first wall 336, the second wall 338, and the base 340. The first wall 336 and the second wall 338 may be the concave shaped wall designed to guide the flow of the gas from the inlet 306 to the outlet 308. Further, the bottom part 304 may comprise the locking mechanism 342 that may be capable of fixedly engaging the bottom part 304 with the top part 302.

Figure 3J:
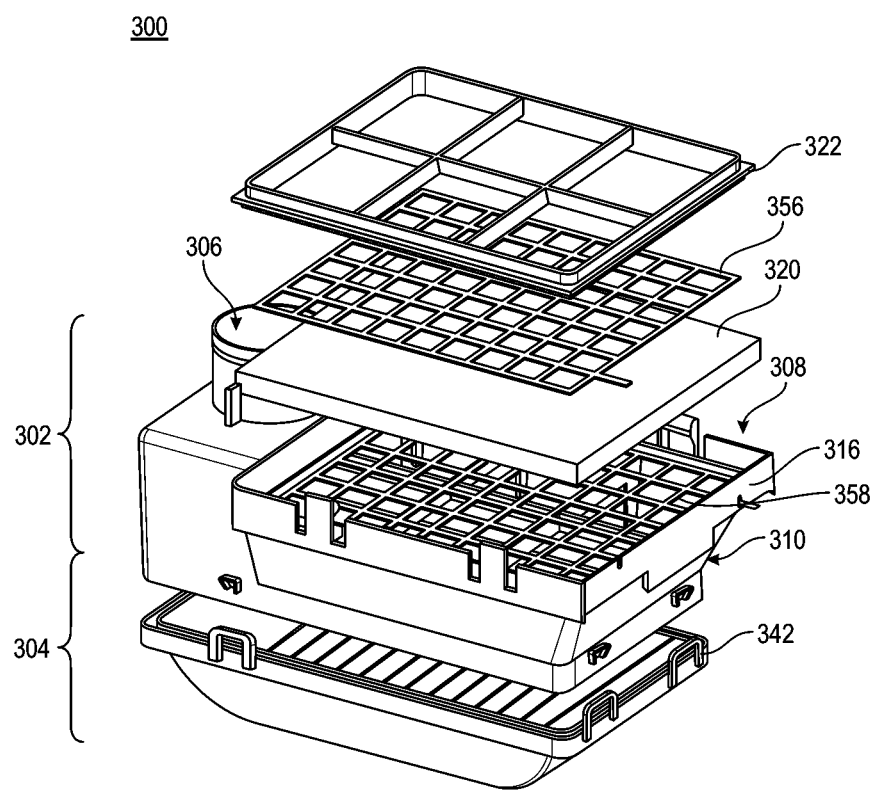
FIG. 3J is a diagram illustrating an exploded view of the multifunctional dust trap, according to an embodiment of the present mechanism.

FIG. 3J is a diagram illustrating an exploded view of the multifunctional dust trap 300, according to an embodiment of the present mechanism. The multifunctional dust trap 300 comprises the top part 302, and the bottom part 304. The top part 302 may comprise the inlet 306, the outlet 308, and the upper chamber 310. The outlet 308 may comprise the frame 316 to fixedly hold the filter pad 320, in an embodiment of the present mechanism. Further, the frame 316 may comprise the upper conductive grid 356, and the lower conductive grid 358 sandwiching the filter pad 320. The upper conductive grid 356 and the lower conductive grid 358 may be further connected to the power source that may be capable of enabling the upper conductive grid 356 and the lower conductive grid 358 to generate an electrostatic charge. The generated electrostatic charge may be used to generate data representing an amount of the micro-dust particles collected by the filter pad 320. The upper conductive grid 356 and the lower conductive grid 358 sandwiching the filter pad 320 may form a capacitor that may enable the capacitive and/or a resistance measurement of the amount of the micro-dust particles collected by the filter pad 320. The frame 316 may further comprise the cover 322 that may be fixedly attached onto the upper conductive grid 356 to hold the upper conductive grid 356 within the frame 316, in an embodiment of the present mechanism. The bottom part 304 may comprise the locking mechanism 342 that may be capable of fixedly attaching the bottom part 304 with the top part 302.

FIG. 4 is a diagram illustrating an installation 400 of the multifunctional dust trap 300 within the gas meter 402. The multifunctional dust trap 300 comprises the inlet 306 that may be connected to a gas inlet 404 of the gas meter 402 using the inlet cavity 312. A flow of a gas may enter from through the inlet 306 into the upper chamber 310 of the multifunctional dust trap 300. In an embodiment of the present mechanism, a larger cross-sectional area of the upper chamber 310 in comparison with the inlet 306 may cause a drop in a velocity of the flow of the gas. Further, the first wall 336 may guide the flow of the gas in a first direction towards a center of the upper chamber 310. The drop in the velocity and the change in the direction of the flow of the gas may cause the dust particles to fall onto the base 340 due to a centrifugal force acting on the dust particles thus separating the dust particles from the gas. Further, the dust particles may get stuck into the ribs 346 running transverse the direction of the flow of the gas, according to an embodiment of the present mechanism. The second wall 338 of the bottom part 304 may further guide the flow of the gas in a second direction towards the outlet 308. The filter pad 320 connected within the frame 316 of the outlet 308 may filter the micro-dust particles and enable the flow of a clean gas to exit the multifunctional dust trap 300 through the outlet 308 into the gas meter 402. Further, the clean flow of the gas may enter a flow tube 406 installed within the gas meter 402. The flow tube 406 may comprise a plurality of flow inlets 408a-408b (hereinafter referred to as the flow inlets 408) for enabling the flow of the gas into the flow tube 406. The flow inlets 408 may be provided to enable a smooth flow within the flow tube 406 by enabling a balanced flow of the clean gas into the flow tube 406. Further, an outlet 410 of the flow tube 406 may be connected to a gas outlet 412 of the gas meter 402 that may be further connected to a pipeline (not shown).

Figure 5:
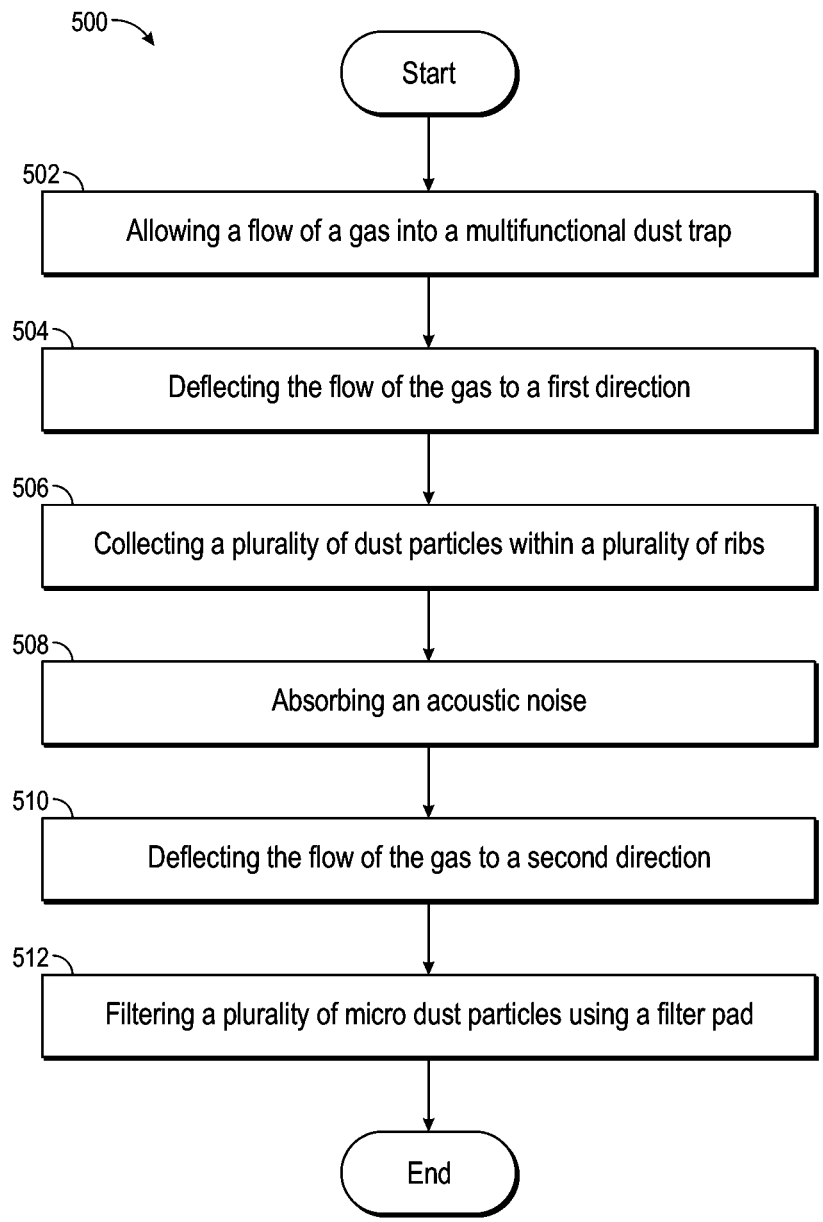
FIG. 5 is a diagram illustrating a method of operating the multifunctional dust trap, according to an embodiment of the present mechanism.

FIG. 5 is a diagram illustrating a method 500 of operating the multifunctional dust trap 100.

At step 502, the flow of the gas may be allowed through the inlet 102 of the multifunctional dust trap 100. In an embodiment of the present mechanism, the inlet 102 may be attached to the gas inlet 204 of the gas meter 202.

At step 504, the flow of the gas may be deflected to a first direction by the first wall 120 of the chamber 106. Further, a larger cross-sectional area of the chamber 106 may cause a drop in a velocity of the flow of the gas.

At step 506, the dust particles may be collected at the base 126 within the ribs 132 running transverse the direction of the flow of the gas.

At step 508, the ribs 132 and the inner surface of the multifunctional dust trap 100 may absorb the acoustic noise that may reach the multifunctional dust trap 100 from the pipeline (not shown).

Next, at step 510, the flow of the gas may be deflected to a second direction by the second wall 122 of the chamber 106. The deflection into the second direction may guide the flow of the gas towards the outlet 104 from the inlet 102 of the multifunctional dust trap 100.

Further, at step 512, the flow of the gas may be filtered using the filter 114 for removing the micro-dust particles from the deflected flow of the gas to enable the exit of the flow of the clean gas into the gas meter 202.

Any publication or patent document that may be noted herein is hereby incorporated by reference to the same extent as if each individual publication, or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A multifunctional dust trap for reducing an acoustic noise and dust filtering, the multifunctional dust trap comprising:
    an inlet connected to a gas inlet of a gas meter;
    a chamber, connected to the inlet, to receive a flow of a gas and to reduce an acoustic noise by a reflection at one or more inner surfaces of the chamber, wherein the chamber comprises:
        a first wall to deflect the flow of the gas in a first direction, wherein the first wall directs the flow of the gas into a cross sectional area of the chamber, which reduces a velocity of the deflected gas such that a centrifugal force guides a plurality of dust particles carried by the gas towards a base of the chamber; and a second wall to deflect the flow of the gas in a second direction, wherein the flow of the gas is deflected from the first direction to the second direction; and an outlet, attached to the chamber, to enable an exit of a clean flow of the gas from the multifunctional dust trap such that the clean flow of the gas is directed away from one or more flow inlets of a flow tube installed within the gas meter resulting in a smooth flow of the gas in the flow tube, and a plurality of ribs extending vertically in an upward direction from the base and transverse a direction of the flow of the gas, and wherein each of the plurality of ribs and/or one or more inner surfaces of the multifunctional dust trap comprises a coating of a sticky material.

2. The dust trap of claim 1, wherein each of plurality of ribs is made up of at least one material selected from, a second material, a natural plastic, a synthetic plastic, a natural rubber, a synthetic rubber, a metal, a glasball filled Polybutylene Terephthalate (PBT) material, a glasball filled Polyoxymethylene (POM) material, or a combination thereof.

3. The dust trap of claim 1, wherein the chamber further comprises a plurality of conductive plates arranged parallel to each other that can be electrically charged for attracting the plurality of dust particles.

4. The dust trap of claim 3, wherein at least one of the plurality of conductive plates is a negatively charged plate and one or more of the plurality of conductive plates are positively charged plates.

5. The dust trap of claim 1, wherein the chamber further comprises an acoustic mat attached to the base and/or the one or more inner surfaces of the chamber.

6. The dust trap of claim 1, wherein the outlet comprises a filter having a filter pad for filtering a plurality of micro-dust particles from the deflected flow of the gas to generate the clean flow of the gas.

7. The dust trap of claim 6, wherein a lower conductive grid and an upper conductive grid sandwiching the filter pad form a capacitor for a capacitive and/or a resistance measurement of a degree of pollution of the filter.

8. The dust trap of claim 1, wherein the inlet further comprises an inlet cavity to fixedly attach the multifunctional dust trap with the gas inlet of the gas meter.

9. A multifunctional dust trap for reducing an acoustic noise and dust filtering, the dust trap comprising:
an inlet to be connected to a gas inlet of a gas meter;
a chamber connected to the inlet, to receive a flow of a gas and to reduce an acoustic noise by a reflection at one or more inner surfaces of the chamber, wherein the chamber comprises:
a first wall to deflect the flow of the gas in a first direction, wherein the first wall directs the flow of the gas into a cross sectional area of the chamber, which reduces a velocity of the deflected gas such that a centrifugal force guides a plurality of dust particles carried by the gas towards a base of the chamber;
a second wall to deflect the flow of the gas in a second direction, wherein the flow of the gas is deflected from the first direction to the second direction;
an acoustic mat, fixedly attached to the base and/or the one or more inner surfaces of the chamber; and a plurality of ribs extending vertically in an upward direction from the base and transverse a direction of the flow of the gas, wherein the acoustic mat and/or each of the plurality of ribs absorbs an acoustic noise; and an outlet, attached to the chamber, to enable an exit of a clean flow of the gas from the multifunctional dust trap such that the clean flow of the gas is directed away from one or more flow inlets of a flow tube installed within the gas meter resulting in a smooth flow of the gas in the flow tube.

10. The dust trap of claim 9, wherein the inlet further comprises an inlet cavity to fixedly attach the multifunctional dust trap with the gas inlet of the gas meter.

11. The dust trap of claim 9, wherein the ribs are made up of at least a material selected from one of, a natural plastic, a synthetic plastic, a natural rubber, a synthetic rubber, a metal, a glasball filled Polybutylene Terephthalate (PBT) material, a glasball filled Polyoxymethylene (POM) material, or a combination thereof.

12. The dust trap of claim 9, wherein one or more inner surfaces of the multifunctional dust trap and/or each of the plurality of ribs comprises a coating of a sticky material.

13. The dust trap of claim 9, wherein the chamber further comprises a plurality of conductive plates arranged parallel to each other such that each of the plurality of conductive plates is electrically charged for attracting the plurality of dust particles.

14. The dust trap of claim 13, wherein at least one of the plurality of conductive plates is a negatively charged plate and one or more of the plurality of conductive plates are positively charged plates.

15. The dust trap of claim 9, wherein the outlet comprises a filter having a filter pad for filtering a plurality of micro-dust particles from the flow of the gas.

16. The dust trap of claim 15, wherein a lower conductive grid and an upper conductive grid sandwiching the filter pad forms a capacitor such that a capacitance and/or a resistance value of the capacitor is used to evaluate a degree of pollution of the filter.

17. A method comprising steps of:
allowing a flow of a gas through an inlet of a multifunctional dust trap;
deflecting the flow of the gas to a first direction, through a first wall of a chamber, such that a velocity of the gas is reduced and a centrifugal force guides a plurality of dust particles from the gas to a base of the chamber;
collecting the plurality of dust particles within a plurality of ribs, attached to a base of the chamber;
absorbing an acoustic noise by each of the plurality of ribs;
deflecting the flow of the gas to a second direction through a second wall of the chamber; and
filtering a plurality of micro-dust particles from the deflected flow of the gas in the second direction by using a filter having a filter pad, attached to an outlet of the multifunctional dust trap.

18. The method of claim 17, further comprising a step of generating an electrostatic charge in the filter pad such that the generated electrostatic charge is used to measure a capacity and/or a resistance of the filter.

* * * * *